United States Patent Office — 2,937,972 — Patented May 24, 1960

2,937,972
METHOD OF CONTROLLING NEMATODE INFESTATION

Henry Bluestone, Cleveland Heights, and William J. Pyne, Painesville, Ohio, assignors to Diamond Alkali Company, Cleveland, Ohio, a corporation of Delaware No Drawing. Filed Nov. 15, 1954, Ser. No. 469,008

4 Claims. (Cl. 167—33)

This invention relates to improvements in the control of soil-infesting organisms, and more particularly relates to new and improved toxic substances for the control of nematodes and other parasitical organisms, as well as methods for their use.

The expression "soil-infesting organism," as used in the specification and claims, is intended to include various organisms, such as wire worms, grubs, maggots, and nematodes, or eel worms. Such organisms have been among the most difficult crop pests to control because of their resistance to prior soil fumigants and other treating substances, and because of their ability to survive in the soil for extended periods of time, even in the absence of host plants. Although specific reference is made hereinafter to the control of nematodes, it will be understood, of course, that the present invention contemplates the control of various soil-infesting organisms and parasitical worms and is not limited to the control of nematodes.

Plants attacked by nematodes are damaged primarily due to the feeding of the nematodes on the plant tissues. Such attacks may destroy plant cells or simply interfere with their normal function. The most common type of nematode damage is manifested as a destruction of the attacked parts and adjacent tissue, or the growth of galls, root-knots or other abnormalities. One of the most easily recognized diseases is that of so-called "root-knot" disease. Such root-knots, or galls, contain nematodes, nematode egg masses and/or larvae. Such gall formation in the root system of a plant not only reduces the size and effectiveness of the root system by rotting or otherwise destroying the roots, but also seriously affects other plant tissues, with the result that unless treated, the plant dies. Even in those instances where plants attacked by nematodes are not completely destroyed, the plants generally are weakened, even though there may be no visible injury to any part of the plant above the ground. Although in the past various nematocidal agents have been suggested and used, the problem of nematode soil infestation remains a serious one.

One of the most effective prior methods for destroying such soil-infesting organisms involves the treatment of the soil with steam. In many instances, such a procedure is highly advantageous, because not only are the nematodes and other organisms destroyed, but also the soil is substantially sterilized. However, it will be understood, of course, that such a treatment is highly impracticable in applications other than greenhouse frames or similar relatively small installations.

Another prior control method involves the use of chloropicrin as a soil fumigant. While chloropicrin is an effective nematocide, in many instances it is quite toxic to growing plants and its use requires that certain precautions be observed to avoid plant damage. Moreover, in some cases, difficulties are involved in obtaining an optimum nematocidal effect since some type of liquid seal over the treated soil frequently is necessary to retain the vapors in the soil for a sufficient period of time.

Another substance which has been proposed and used in the control of nematodes is the so-called "DD mixture" (dichloropropane-dichloropropene). While this substance avoids certain of the difficulties encountered in other nematocides, it also has failed to provide a complete solution to the problem of nematode control.

It is therefore a principal object of this invention to provide new and improved toxic substances which are useful in control of nematodes and other soil-infesting organisms.

A further object of the invention is the provision of improved methods for controlling nematodes and other soil-infesting organisms.

A still further object of the invention is to provide novel compositions of matter particularly useful in the control of nematodes and other soil-infesting organisms.

These and other objects and advantages will appear more fully in the following description of the invention.

The present invention contemplates the use, in the control of soil-infesting organisms, of a compound having the formula:

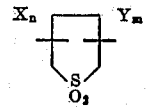

wherein $n$ is a number from 1 to 3, inclusive, $m$ is a number from 0 to $4-n$, inclusive, X is halogen, and Y is hydroxy.

Illustrative of specific compounds of the above type are:

3,4-dibromo-tetrahydrothiophene-1,1-dioxide,
3-chloro-4-hydroxy-tetrahydrothiophene-1,1-dioxide,
3,4-dichloro-tetrahydrothiophene-1,1-dioxide,
3,4-dibromo-3-chloro-tetrahydrothiophene-1,1-dioxide,
$x$,3,4-trichloro-tetrahydrothiophene-1,1-dioxide,
3-chloro-tetrahydrothiophene-1,1-dioxide Compositions embodying the invention may be employed in a variety of nematocidal and other parasitical applications. The nature of these compositions will depend, to a large degree, upon the particular application contemplated. Hence, they may be utilized in any conventional manner, as in soil application by spraying, drenching, or dusting. In addition, in many instances it is advantageous to introduce compositions of the invention directly into the soil by hand or mechanical sub-soil injectors. Generally, superior results are obtained in sub-soil applications when the novel compositions of this invention are introduced into the soil to a depth of 6" or less. The term "soil," as used herein, is intended to include any substance or medium capable of supporting the growth of plants. It is therefore intended to include, in addition to soil, humus, manure, compost, sand, and artificially-created plant growth media, including solutions and/or other hydroponic media.

Compositions of this invention may also be embodied in dusting compounds containing carriers or fillers, such as talc, sand, dry soil, celite, kaolin, fuller's earth, kieselguhr, diatomaceous earth, chalk, gypsum, pyrophyllite, or other inorganic or organic materials, including active ingredients, such as fertilizers, insecticides, fungicides, and/or herbicides. Similarly, if a liquid drench or spray material is desired, a composition of the invention may be formulated as a liquid using as a carrier material various solvents, diluents, extenders, and the like, such as water, aromatic and aliphatic organic liquids, such as acetone, benzene, and/or various alcohols, ethers, ketones, and the like, as well as various petroleum fractions.

Liquid compositions may also contain minor quantities of one or more wetting agents, such as Igepal CO-880 (alkyl phenoxypolyoxyethylene ethanol), Arquad 2-C (quaternary ammonium compound of the formula RR'—N—(CH$_3$)$_2$Cl), Emulphor ON-870 (polyoxyethylated fatty alcohol), Tween 80 (polyoxyethylene sorbitan monnoleate), Triton X-155 (alkyl aryl polyether alcohol), Trem 615 (polyhydric alcohol ester), Tween 85 (polyoxyethylene sorbitan trioleate), Nonic 218 (polyethylene glycol tertdodecyl thioether), Santomerse D (decyl benzene sodium sulfonate), Pluronic F-68 (condensate of ethylene oxide with an hydrophobic base formed by condensing propylene oxide with propylene glycol), Antarox A-400 (alkyl phenoxypolyoxyethylene ethanol), Triton X-120 (alkyl aryl polyether alcohol), Nacconol NRSF (alkyl aryl sulfonate), Aresol OS (isopropyl napthylene sodium sulfonate), Span 40 (sorbitan monopalmitate), Triton B-1956 (modified phthalic glycerol alkyd resin), and Antarox B-290 (polyoxyethylated vegetable oil).

While compounds of the above type may be prepared by various means, they are advantageously prepared either alone, or in admixture, by reaction of a conjugated olefin and sulphur dioxide followed by appropriate addition across the double bond. Hence, the practice of this invention contemplates the use as a nematocide of various saturated and unsaturated halogen-containing derivatives of reaction products of conjugated olefins and sulphur dioxide, i.e., halogenated tetrahydrothiophene-1-1-dioxides. It will be understood, of course, in the preparation of compounds embodying the present invention, that a pure compound need not necessarily be isolated and that purification is generally practicable only to the extent necessary for removing by-products and/or impurities which would disadvantageously affect the reaction yield, nematocidal activity, or phytotoxicity.

Nematocidal activity of compositions embodying the invention may be determined in the following manner: one-half gallon glazed crocks having an opening in the bottom are filled with screened, composted soil. This soil is then inoculated with root nematode galls obtained from tomato plants infested with the so-called "Tomato Root Nematode" (*Meloidogyne incognita*). Such galls vary in size from about 1/8" to 1/4" in diameter. 5 gms. of tomato roots, cut into pieces about 1/2" long, are mixed with the thus treated soil in each one-half gallon crock.

The crocks are then watered lightly and allowed to stand over night. Soil additives of this invention, if in liquid form and volatile, are injected in the center of the crock to a depth of about 3" at varying dosages in different tests. If in solid or powder form, the additives are mixed thoroughly with the soil in similar dosages. After the soil is thus treated, the crocks are watered frequently to maintain desired moisture content and are allowed to stand for 10 days, at which time a number of test seeds, e.g., typically squash seeds, are planted in each crock. Two control crocks are similarly prepared. Results are taken in about 20 days after the seeds are planted. The infestation, i.e., the number of galls, is determined either by placing the roots in water in a large Petri dish, or when the roots are heavily infested the degree of infestation is estimated by comparison with the control plants, to which no soil additives have been introduced.

In order that those skilled in the art may more completely understand this invention and the method by which the same may be carried into effect, the following specific examples are offered:

EXAMPLE I

Part A

Preparation of 2,5-dihydrothiophene-1,1-dioxide.—Into a steel bomb are introduced 140 gms. of liquid 1,3-butadiene and 380 gms. of liquid sulfur dioxide, the gases being liquefied by prior cooling in a Dry Ice bath. The bomb is sealed and heated to a temperature of 100° C., a pressure of 300 p.s.i. being reached after one hour. Heating is continued until the pressure drops to 100 p.s.i. The bomb contents are then cooled to a temperature of 8° C. The liquid product, after evolution of unreacted gases, is dissolved in acetone or other solvent. The acetone is then removed by distillation, the crude product isolated thereby weighing 170 gms. (70% theoretical yield). The purified product after recrystallization is shown to be 2,5-dihydrothiophene-1,1-dioxide (butadiene sulfone).

Part B

Preparation of 3,4-dichloro-tetrahydrothiophene-1,1-dioxide.—Into a round-bottom flask equipped with a stirrer, thermometer, and reflux condenser are introduced 100 gms. of 2,5-dihydrothiophene-1,1-dioxide dissolved in 400 ml. of carbon tetrachloride. The resulting solution is then heated to a temperature of 50° C., at which time 60 gms. of chlorine is gradually introduced. From the reaction mixture there is obtained a white precipitate weighing 159 gms. The analysis of the product indicates it to have the composition $C_4H_6Cl_2O_2S$:

| Constituent | Percent Calculated | Percent Actual |
| --- | --- | --- |
| Carbon | 21.40 | 21.67 |
| Hydrogen | 2.23 | 2.16 |
| Chlorine | 47.70 | 46.60 |

To illustrate nematocidal activity of the compound produced according to Example I and other compounds embodying the invention, there follow, indexed comparatively, results of experiments conducted according to the hereinbefore described test procedure:

| Example | Compound | Dosage per Crock | Seedlings Emerged [1] | Degree of Nematode Infection [2] |
| --- | --- | --- | --- | --- |
| II | 3,4-dichloro-tetrahydrothiophene-1,1-dioxide | 0.50 gm | 7 | 0 |
| | | 0.25 gm | 8 | 0 |
| | | 0.125 gm | 6 | 0 |
| III | 3-chloro-tetrahydrothiophene-1,1-dioxide | 0.5 gm | 4 | 0 |
| IV | x,3,4-trichloro-tetrahydrothiophene-1,1-dioxide | 0.125 gm | 7 | 0 |
| V | 3,4-dibromo-tetrahydrothiophene-1,1-dioxide | 1.0 gm | 7 | 0 |
| VI | 3-chloro-4-hydroxy-tetrahydrothiophene-1,1-dioxide | 0.5 gm | 5 | 0 |
| VII | Dichloropropene-dichloropropane (Shell D-D) | 0.5 ml | 5 | 0 |
| | | 0.25 ml | 7 | + |
| | | 0.125 ml | 7 | ++ |
| VIII | Untreated—control test | | 7 | +++ |

[1] 8 seedlings planted per test crock.
[2] Rating of nematode infestation: 0=none; +=mild; ++=moderate; +++=severe.

It is to be understood that although the invention has been described with specific reference to particular embodiments thereof, it is not to be so limited, since changes and alterations therein may be made which are within the full intended scope of this invention as defined by the appended claims.

What is claimed is:

1. The method of controlling nematode infestation in nematode infested material which comprises adding to said nematode infested material a nematocidal amount of a compound selected from the group consisting of 3,4-dichloro-tetrahydrothiophene-1,1-dioxide;
3-chlorotetrahydrothiophene-1,1-dioxide;
3,4-dibromo-tetrahydrothiophene-1,1-dioxide;
3-chloro-4-hydroxy-tetrahydrothiophene-1,1-dioxide;

and a trichlorotetrahydrothiophene-1,1-dioxide of the formula

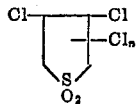

wherein $n=1$.

2. The method of claim 1 wherein the said compound selected from said group is 3,4-dichloro-tetrahydrothiophene-1,1-dioxide.

3. The method of claim 1 wherein the compound selected from said group is 3-chloro-tetrahydrothiophene-1,1-dioxide.

4. The method of claim 1 wherein the compound selected from said group is a trichloro-tetrahydrothiophene-1,1-dioxide of the formula:

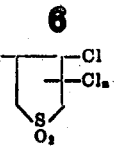

wherein $n=1$.

References Cited in the file of this patent

UNITED STATES PATENTS

| | | |
|---|---|---|
| 2,439,345 | Morris | Apr. 6, 1948 |
| 2,460,233 | Morris et al. | Jan. 25, 1949 |
| 2,461,340 | Morris | Feb. 8, 1949 |
| 2,465,912 | Morris | Mar. 29, 1949 |
| 2,610,192 | Mahan et al. | Sept. 9, 1952 |
| 2,656,362 | Faith | Oct. 20, 1953 |

OTHER REFERENCES

Backer et al.: Rec. Trav. Chim., 53:525–543.
Backer et al.: Rec. Trav. Chim., 58:778–784.
Van Zuydewijn: Rec. Trav. Chim., 57:445–455 (1938).
Jordan: J.A.C.S., 71:1875-6 (1949).
Backer et al.: Recueil des Trauaux Chimiques des Pays Bas, vol. 62, pp. 815–823 (1943).